United States Patent
Leister et al.

(10) Patent No.: US 11,397,407 B2
(45) Date of Patent: Jul. 26, 2022

(54) HOLOGRAPHIC DISPLAY DEVICE

(71) Applicant: SEEREAL TECHNOLOGIES S.A., Munsbach (LU)

(72) Inventors: Norbert Leister, Dresden (DE); Ralf Haussler, Dresden (DE)

(73) Assignee: SEEREAL TECHNOLOGIES S.A., Munsbach (LU)

(*) Notice: Subject to any disclaimer, the term of this patent is extended or adjusted under 35 U.S.C. 154(b) by 350 days.

(21) Appl. No.: 16/327,886

(22) PCT Filed: Aug. 24, 2017

(86) PCT No.: PCT/EP2017/071328
§ 371 (c)(1),
(2) Date: Feb. 25, 2019

(87) PCT Pub. No.: WO2018/037077
PCT Pub. Date: Mar. 1, 2018

(65) Prior Publication Data
US 2019/0196402 A1 Jun. 27, 2019

(30) Foreign Application Priority Data

Aug. 24, 2016 (EP) .................................... 16185438
Oct. 18, 2016 (EP) .................................... 16194351

(51) Int. Cl.
*G03H 1/22* (2006.01)
*G02B 5/20* (2006.01)
(Continued)

(52) U.S. Cl.
CPC ............ *G03H 1/2205* (2013.01); *G02B 5/201* (2013.01); *G02B 5/22* (2013.01); *G02B 27/0988* (2013.01);
(Continued)

(58) Field of Classification Search
CPC ............... G03H 1/2205; G03H 1/2294; G03H 2223/12; G03H 2226/05;
(Continued)

(56) References Cited

U.S. PATENT DOCUMENTS 8,493,642 B2   7/2013  Schwerdtner et al.
2006/0033972 A1  2/2006  Takemori
(Continued)

FOREIGN PATENT DOCUMENTS

WO    2008/142000 A1    11/2008

OTHER PUBLICATIONS

Minsik Park et al., "Digital Holographic Display System with Large Screen Based on Viewing Window Movement for 3D Video Service," ETRI Journal, Bd. 36, No. 2, pp. 232-241 (Apr. 1, 2014) XP055456037.
(Continued)

*Primary Examiner* — Robert E. Tallman
(74) *Attorney, Agent, or Firm* — Saul Ewing Arnstein & Lehr LLP

(57) ABSTRACT

The invention relates to a holographic display device for representing a two-dimensional and/or three-dimensional scene. The holographic display device comprises at least one spatial light modulator device and an optical component. The at least one spatial light modulator device is provided in order to reconstruct the scene and in order to generate at least one virtual visibility region in an observer plane. The optical component is configured with at least two regions that have a different transparency to one another, the value of the transparency respectively lying between 0 and 1. Furthermore, the optical component is arranged in the display device in such a way that it provides filtering, to be carried out at least partially, of a diffraction order spot in at least one diffraction order inside the virtual visibility region.

26 Claims, 6 Drawing Sheets

(51) Int. Cl.
*G02B 5/22* (2006.01)
*G02B 27/09* (2006.01)
*G02B 27/58* (2006.01)
*H04N 13/366* (2018.01)
*G03H 1/08* (2006.01)

(52) U.S. Cl.
CPC ........... *G02B 27/58* (2013.01); *G03H 1/2294* (2013.01); *H04N 13/366* (2018.05); *G03H 2001/0825* (2013.01); *G03H 2001/2207* (2013.01); *G03H 2001/2236* (2013.01); *G03H 2001/2242* (2013.01); *G03H 2001/2255* (2013.01); *G03H 2223/12* (2013.01); *G03H 2223/17* (2013.01); *G03H 2223/18* (2013.01); *G03H 2223/53* (2013.01); *G03H 2226/05* (2013.01)

(58) Field of Classification Search
CPC ... G03H 2001/0825; G03H 2001/2242; G03H 2001/2236; G03H 2001/2207; G03H 2001/2255; G03H 2223/17; G03H 2223/18; G03H 2223/53; H04N 13/366; G02B 5/201; G02B 5/22; G02B 27/0988; G02B 27/58
See application file for complete search history.

(56) References Cited

U.S. PATENT DOCUMENTS

| | | |
|---|---|---|
| 2009/0128872 A1 | 5/2009 | Christmas |
| 2010/0149313 A1 | 6/2010 | Kroll et al. |
| 2011/0149359 A1 | 6/2011 | Leister |
| 2013/0222384 A1* | 8/2013 | Futterer ............... G02B 5/32 345/426 |
| 2015/0085331 A1* | 3/2015 | Chae ............... G03H 1/2294 359/9 |

OTHER PUBLICATIONS

International Search Report, dated Mar. 14, 2018, and Written Opinion issued in International Application No. PCT/EP2017/071328.

* cited by examiner

HOLOGRAPHIC DISPLAY DEVICE

CROSS REFERENCE TO RELATED APPLICATIONS

This application claims the priority of PCT/EP2017/071328, filed on Aug. 24, 2017, which claims priority to European Application No. EP 16185438.5, filed on Aug. 24, 2016, and European Application No. EP 16194351.9, filed on Oct. 18, 2016, the entire contents of each of which are incorporated fully herein by reference.

BACKGROUND OF THE INVENTION

The invention relates to a holographic display device for representing a two-dimensional and/or three-dimensional scene. Such a holographic display device may for example be configured as a direct-view display, as a projection display, as a head-mounted display, but also as a head-up display. The present display device is suitable particularly in head-mounted displays and in head-up displays, although the invention is of course not intended to be restricted to such display devices.

The present holographic display device is configured so that it can display two-dimensional (2D) and/or three-dimensional (3D) images. It is therefore inherently clear that two-dimensional images or three-dimensional images may also comprise two-dimensional or three-dimensional contents or films.

In the case of a screen for representing two-dimensional and/or three-dimensional images or films/videos, it is necessary to produce bright and homogeneous illumination of the entire area of the screen with high resolution. The image information or scene information to be represented is written as a hologram into the spatial light modulator device of the display device. The light emitted by an illumination device, which comprises at least one light source, is modulated with the information written into the spatial light modulator device, the spatial light modulator device often being used at the same time as a screen or display panel. It is therefore necessary to ensure strictly parallel incidence of the light beams onto the spatial light modulator device, and to achieve a high frame rate of the spatial light modulator device. In order to achieve a high quality of the three-dimensional representation of the information written into the spatial light modulator device, defined collimation of the wavefronts which are output from the illumination device, in addition to homogeneous illumination of the entire area of the spatial light modulator device, are necessary. This is particularly important for holographic representations in the form of a reconstruction to be generated. The holographic information, which may for example be an object consisting of object points of a three-dimensional scene, is encoded in the form of the amplitude and phase values into the pixels of the spatial light modulator device. The encoded object points are generated by the wave field which is emitted by the spatial light modulator device.

For example, display devices arranged or provided close to an observer's eye, for example head-mounted displays (HMDs), furthermore require a lightweight and compact setup, so that however the size and pixel number of a spatial light modulator device (SLM) provided in the display device, and the imaging optics used, may be limited.

Some types of spatial light modulator devices furthermore have restrictions in the realistically usable pixel sizes. Spatial light modulator devices based on liquid crystals have, for example, greater crosstalk between neighboring pixels with a decreasing pixel pitch. The pixels cannot therefore be miniaturized to any extent desired. The usable number of pixels on the spatial light modulator device having a realistic overall size is therefore restricted to a compact mobile display device. The present invention is not, however, intended to be restricted to a particular type of spatial light modulator device.

For holographic display devices, or displays, which generate a virtual visibility region or a virtual viewing window, the resolution of a three-dimensional (3D) scene in the hologram calculation is in principle freely selectable. On the other hand, however, the size of this virtual visibility region or of the virtual viewing window depends on the number of pixels per degree of viewing angle.

In order to be able to see a three-dimensional scene with the full possible resolution for a human eye, the virtual visibility region or the virtual viewing window should have at least the size of the pupil of an observer's eye. Although the virtual visibility region or a viewing window smaller in its size than the pupil of the observer's eye may in principle also be used for the reconstruction of a three-dimensional scene, this would however typically lead to a resolution, perceived in an inferior way, of the three-dimensional scene in comparison with the natural vision, even if the hologram to be encoded into the spatial light modulator device has been calculated with a high resolution of object points.

Advantageously, the size or extent of the virtual visibility region or viewing window is selected to be greater than or only slightly greater than the pupil size of an observer's eye, in order to compensate for tolerances in the detection or recognition of the observer's eye position.

For the generation of a three-dimensional scene by means of holography, the writing of a complex-valued hologram into the spatial light modulator device is generally required. In this case, a plurality of pixels of the spatial light modulator device may either be combined by means of encoding to form a macropixel or combined by a beam combiner unit to form a macropixel. The hologram is in this case composed of by means of a plurality of subholograms. For the encoding of an individual object point of a scene, a complex-valued subhologram is calculated, which is encoded into a defined region on the spatial light modulator device, i.e. the information relating to the object point is then encoded in this subhologram on the spatial light modulator device.

In a holographic display device, or display, in particular a direct-view display, having at least one spatial light modulator device (SLM), a virtual viewing window or a virtual visibility region being provided in an observer plane, the size of the visibility region is usually selected in such a way that it corresponds to less than or equal to the distance between two diffraction orders. This spacing of the diffraction orders is given by the equation $D*\lambda/p$, where D is the distance from the virtual visibility region to the display device, $\lambda$ is the wavelength of the light and p is the pixel pitch of the spatial light modulator device. For a color display in which different wavelengths are used, for example wavelengths for red, green and blue light, the size of the visibility region is usually selected in such a way that it is less than or equal to the spacing of two diffraction orders for the shortest wavelength, in general the wavelength for blue light.

In a holographic projection display or a holographic head-mounted display (HMD), in which a real or virtual image of the spatial light modulator device is generated, the distance from the spatial light modulator device to an observer plane, in which the observer of a reconstructed scene is located, is replaced with the distance from the image of the spatial light modulator device to the observer plane, and the pixel pitch of the spatial light modulator device is replaced with the pixel pitch of the image of the spatial light modulator device. The size of the virtual visibility region, which may also be referred to as a virtual viewing window, is in this way upwardly limited. The individual calculated subholograms, which are superimposed to form a hologram or overall hologram and are encoded into the spatial light modulator device, may be encoded as symmetrical lens functions. If this is the case, the virtual visibility region in the observer plane lies almost centrally around the focal point of a field lens provided in the display device.

FIG. 1 represents a display device which comprises a spatial light modulator device SLM, an illumination device 2 comprising at least one light source 3, and a field lens 1. In this case, the zeroth diffraction order ($0^{th}$ BO) and the $1^{st}$ and $-1^{st}$ diffraction orders ($+1^{st}$ BO and $-1^{st}$ BO) are shown of a diffraction pattern which is formed because of the pixel grid of the spatial light modulator device SLM in the focal plane of the field lens 1. In this representation of FIG. 1 no hologram or subhologram encoded into the spatial light modulator device SLM is shown.

The intensity in the individual diffraction orders of the diffraction pattern depends in this case on the fill factor of the spatial light modulator device SLM and other factors, for example the shape of the pixel aperture, for example rectangular or rounded, or also the profile of the pixel transmission, for example abruptly decreasing to zero or becoming continuously darker toward the edge region of the pixel.

FIG. 2 shows by way of example a graphical representation of the amplitude in the individual diffraction orders in one dimension (for example horizontally) in the case of a fill factor of 85% in this dimension of the pixels of the spatial light modulator device when using a constant phase of the light, i.e. an equal phase value for all phase-modulating pixels. As can be seen, the intensity of the light in the zeroth diffraction order is the greatest. The light intensity in the individual diffraction orders is proportional to the square of the amplitude represented. For the representation, however, the amplitude has been selected in order to be able to better visualize the light component in the higher diffraction orders.

According to experience, a so-called diffraction order spot, which is often also referred to as a zero-order spot, is formed in the observer plane from which an observer can observe a reconstructed scene at the same position as that where a focus of the field lens or of an optical system would be formed by the imaging of a light source if no hologram was encoded into the spatial light modulator device. This diffraction order spot results, for example, from errors in the modulation of the spatial light modulator device. In this case, a fraction of the incident light is unmodulated because of insufficient coherence, or the spatial light modulator device has systematic deviations from the desired modulation, for example an undesired amplitude modulation in a spatial light modulator device which is only meant to modulate phases, or a range of the phase modulation of less than $2\pi$, or systematically excessively large or excessively small phase values. If an optical system used comprises a focusing optical element, for example the field lens 1 shown in FIG. 1, the unmodulated light or systematically incorrectly modulated light is focused into a so-called diffraction order spot in the observer plane. In addition, higher diffraction orders of the diffraction order spot are respectively also formed. If the virtual visibility region is generated centrally with respect to the spatial light modulator device, or is arranged in the observer plane, this diffraction order spot then lies at the center of the virtual visibility region.

FIG. 3 represents the display device according to FIG. 1 in an ideal case in which there is no diffraction order spot in an observer plane 6. A subhologram 4, by means of which an object point of a scene can be reconstructed, is encoded into the spatial light modulator device SLM. In this case, a virtual visibility region 5 is provided in the zeroth diffraction order.

FIG. 4 shows a graphical representation of the amplitude in the respective zeroth diffraction order, $+1^{st}$ diffraction order and $-1^{st}$ diffraction order in the case of a rectangular pixel aperture of the spatial light modulator device. In this example, the subhologram encoded into the spatial light modulator device comprises a lens function which generates an object point at a distance of 250 mm in front of the spatial light modulator device, the virtual visibility region being located 1 m away from the spatial light modulator device. A similar profile of the amplitude in the diffraction orders would also be obtained for object points of a three-dimensional scene at other distances from the spatial light modulator device. The zeroth diffraction order in this case has an extent of about 15 mm. The intensity of the light in the zeroth diffraction order, in which the virtual visibility region is provided, is at greatest, as can be seen from the oscillation of the amplitude represented. In the $+1^{st}$ diffraction order and the $-1^{st}$ diffraction order, the intensity is reduced but is still high enough that these diffraction orders may also be used, at least partially, if necessary.

FIG. 5 represents the display device according to FIG. 3, a subhologram 4 being encoded into the spatial light modulator device SLM. For reasons of clarity, only one subhologram 4 is represented, although a multiplicity of subholograms, which together form a hologram with which a three-dimensional scene can be reconstructed, may of course be encoded into the spatial light modulator device SLM. In the observer plane 6, a virtual visibility region 5 is provided, for example in the zeroth diffraction order. A different diffraction order could, however, also be selected, for example the $+1^{st}$ diffraction order or the $-1^{st}$ diffraction order. In this case, a diffraction order spot GAS ($0^{th}$ GAS), which may have a negative effect on the reconstruction or on the reconstructed scene, is formed in the observer plane 6, particularly in the virtual visibility region 5. Higher diffraction orders of the diffraction order spot, here the $+1^{st}$ diffraction order spot ($+1^{st}$ GAS) and the $-1^{st}$ diffraction order spot ($-1^{st}$ GAS), are likewise formed in the observer plane 6, i.e. in the higher diffraction orders, here the $+1^{st}$ diffraction order and the $-1^{st}$ diffraction order.

For an observer of the reconstructed scene, who is located with his eye at the center of the virtual visibility region 5, this diffraction order spot ($0^{th}$ GAS) would lead to a perturbing background being superimposed on the reconstructed three-dimensional (3D) scene in his perception, i.e. there being a reduced contrast of the scene. In this way, the quality of the reconstructed scene is reduced, or negatively influenced.

SUMMARY OF THE INVENTION

It is therefore an object of the present invention to provide a display device for representing a two-dimensional and/or three-dimensional scene, with which a high quality of the reconstructed scene can be achieved. In particular, a negative influence of a diffraction order spot in the observer plane on the reconstructed scene is intended to be eliminated or reduced.

The present object is achieved according to the invention by a holographic display device according to the features of claim 1.

The holographic display device according to the invention is intended for the representation of a two-dimensional and/or three-dimensional scene. The holographic display device comprises at least one spatial light modulator device and an optical component. The at least one spatial light modulator device is intended for the reconstruction of the scene and for the generation of at least one virtual visibility region in an observer plane. The optical component is configured with at least two regions that have a different transparency to one another. The value of the transparency respectively lies between 0 and 1. The optical component is arranged in the display device in such a way that it provides filtering, to be carried out at least partially, of a diffraction order spot in at least one diffraction order inside the virtual visibility region. In this way, the diffraction order spot resulting from errors in the modulation of the light can be reduced or even entirely filtered out, particularly in the region of the at least one virtual visibility region. A reduction of the intensity of the diffraction order spot in a diffraction order used for the virtual visibility region may, for example, be achieved by providing a grayscale profile in the optical component. Complete filtering of the diffraction order spot out from the diffraction order used may advantageously be carried out by one region of the optical component having a high transparency. For example, this region could have a transparency of $T \geq 0.8$, a transparency value of 0 (zero) meaning opaque, or nontransparent, and a transparency value of 1 meaning fully transparent, or fully optically transmissive. Therefore, the greater the transparency value of a region of the optical component is, the more optically transmissive this region is. Another region of the optical component, on the other hand, has a transparency value of 0 (zero), and is therefore configured to be opaque. This opaque region of the optical component may then advantageously be assigned to the diffraction order spot to be filtered out, so that the size of the opaque region completely covers the diffraction order spot and therefore fully filters it out from the resulting diffraction pattern in the observer plane.

Therefore, it may advantageously be provided that the optical component comprises a transparent region and at least one opaque region, or at least one region having reduced transmission. The at least one opaque region, or the at least one region having reduced transmission, of the optical component is advantageously configured to be substantially smaller in its size than the transparent region of the optical component. In this case, the at least one opaque region of the optical component provides filtering, to be carried out at least partially, of a diffraction order spot in at least one diffraction order inside the virtual visibility region.

Partial filtering of the diffraction order spot out from the diffraction order used may, for example, be carried out by means of the at least one opaque region in the optical component, which is configured in the optical component in such a way that this opaque region is assigned to the diffraction order spot but the size of the opaque region only covers a part of the diffraction order spot.

As an alternative, partial filtering of the diffraction order spot out from the diffraction order used may, for example, also be carried out by means of at least one region having greatly reduced transparency in the optical component, which is configured in the optical component in such a way that this opaque region is assigned to the diffraction order spot and covers at least a part of the area of this spot.

The transparent region is in this case to be understood as a base region into which at least one opaque region is introduced.

In some advantageous configurations of the invention, as an alternative to the transparent region in conjunction with the at least one opaque region, or in addition thereto, the optical component may comprise regions having a transparency gradient, i.e. a grayscale profile. This grayscale profile may, for example, also be used in order to modify the distribution of the light intensity in the virtual visibility region. For example, the distribution of the light intensity in the diffraction orders may lead to an observer, whose eye pupil is located in an edge region of the virtual visibility region, perceiving a darker reconstruction of a preferably three-dimensional scene than in the middle, or in the opposite edge region of the virtual visibility region. In this case, by a grayscale profile of the transparency of the optical component, the light distribution can be generated more uniformly by darkening regions of the virtual visibility region having increased brightness.

In particular, in a holographic display device according to the invention which is designed as a projection display device or as a head-mounted display (HMD) and comprises a two-stage system, it may be provided that a real intermediate image of the spatial light modulator device and a real intermediate image of the virtual visibility region are generated. Advantageously, the optical component may be provided in a plane of a generated intermediate image of the at least one virtual visibility region.

Further advantageous configurations and refinements of the invention may be found in the other dependent claims.

Advantageously, it may be provided that the opaque region, or the at least one region having reduced transmission, of the optical component is configured in its size to be smaller than an eye pupil of the human eye, and preferably corresponds to only from 10% to 40% of the size of an eye pupil. Since a diffraction order spot which is formed in the diffraction pattern is usually configured to be substantially smaller in its extent than a typical size of about 2 mm—about 5 mm of an eye pupil of an observer of a reconstructed preferably three-dimensional scene under daylight conditions, and this diffraction order spot is filtered out at least partially by means of the opaque region of the optical component or by means of the at least one region having reduced transmission, such filtering of the diffraction order spot has no perturbing influence of the preferably three-dimensional scene perceived by the observer. Sufficient light therefore still passes through the pupil into the observer's eye, so that he can observe the reconstructed scene with high quality.

In one advantageous configuration of the invention, it may be provided that the optical component is configured to be movably controllable.

In the general and preferred case, the optical component for filtering at least one diffraction order spot may be configured to be movable. Since, for example depending on an eye position of an observer in the virtual visibility region, a diffraction order spot in only one diffraction order would lead to perturbations or effects, for example only the diffraction order spot in the zeroth diffraction order or in the $+1^{st}$ diffraction order or in the $-1^{st}$ diffraction order, not all diffraction order spots in the diffraction pattern would therefore need to be filtered out at least partially by the optical component, but respectively only a diffraction order spot in the diffraction order used for the reconstruction.

It is therefore possible in this way to configure the optical component for the filtering in such a way that, for example, only a single opaque or blackened region or a region with reduced transmission is provided. The optical component having this single opaque or blackened region or region with reduced transmission may then be displaced or moved according to the detected eye position of the observer in such a way that the opaque or blackened region or region with reduced transmission filters out one of the diffraction order spots of the diffraction orders, for example either the diffraction order spot of the zeroth diffraction order, also referred to as the zeroth diffraction order spot, or another diffraction order spot in a higher diffraction order.

It may, however, also be provided that the optical component comprises a plurality of transparent regions and a plurality of opaque regions, or a plurality of regions having reduced transmission, which are provided in such a way that diffraction order spots are filtered out in different diffraction orders.

This means that the optical component may, however, also be configured to be static, i.e. not movable. To this end, in order to filter a diffraction order spot in the zeroth diffraction order and in the $\pm 1^{st}$ diffraction order and for filtering all higher diffraction orders beyond the $\pm 2^{nd}$ diffraction order, the optical component may, in an alternative advantageous configuration of the invention comprise a plurality of opaque or blackened regions, i.e. light-blocking regions, or a plurality of regions having reduced transmission, and a transparent region, i.e. an optically transmissive region, the transparent region being used as a base region. This transparent region is subdivided into a plurality of transparent regions by the provision of a plurality of opaque regions or a plurality of regions having reduced transmission.

Expediently, it may be provided according to the invention that the optical component is configured in such a way that predefined or determined higher diffraction orders are filtered out fully.

In another advantageous configuration of the invention, it may be provided that the optical component is configured as a film or as an actively switchable component, preferably as a component comprising a liquid-crystal layer. The liquid-crystal layer may be combined with at least one polarization element. Furthermore, the liquid-crystal layer may be provided with an electrode arrangement, to which a voltage can be applied in order to control the liquid-crystal layer and correspondingly align the liquid crystals. Depending on the switching state of the liquid-crystal layer by means of the electrode arrangement, the polarization element transmits or blocks the incident light.

As an alternative, it may advantageously be provided that, instead of simple light-blocking or opaque regions, or regions having reduced transmission, and a fully transparent region, the optical component for filtering at least one diffraction order spot may also comprise a defined or predetermined grayscale profile.

Furthermore, instead of or in addition to a grayscale profile, the optical component for the filtering may also comprise a defined or predetermined phase profile. This means that the optical component may be configured in such a way that it comprises a defined grayscale profile and/or a defined phase profile.

In this case, the grayscale may be specified in the optical component in such a way that a predefined light intensity is respectively filtered out partially from a brighter region of a diffraction order. The amount of light which is filtered out, or is intended to be filtered out, from the diffraction order by the grayscale profile may, for example, be determined by prior simulations, so that the grayscale profile of the optical element can be correspondingly defined and the optical component can be configured accordingly.

In order to be able to reconstruct a scene preferably three-dimensionally, a hologram, which is composed of at least one subhologram, may be encoded into the at least one spatial light modulator device. An object point to be reconstructed of the scene is respectively encoded in a subhologram, so that a plurality of subholograms form a hologram that reconstructs the entire scene.

In one particular case, it may also be the case that the holographic display device is in an ON state but does not represent a scene or object points. This means that no subhologram or hologram is encoded in the spatial light modulator device, and its illumination is entirely dark or black. In such a case, it would also be advantageous for at least one diffraction order spot in the observer plane to be filtered in order to give an entirely black representation. This case is likewise intended to be included by the present invention.

Furthermore, in one particularly advantageous configuration of the invention, it may be provided that the hologram or each subhologram comprises a prism function in order to displace the virtual visibility region in the observer plane.

If, for example, a prism function with a phase difference of $\pi$ (pi) is used between neighboring pixels of the spatial light modulator device, movement of the virtual visibility region in the observer plane takes place by half a diffraction order. A phase difference of $a*\pi$ between neighboring pixels with a real-valued factor a correspondingly leads to movement of the virtual visibility region by a times half a diffraction order. The size of the diffraction order corresponds to $D*\lambda/p$, where D is the distance from the virtual visibility region to the spatial light modulator device or to the image of the spatial light modulator device where there is imaging of the spatial light modulator device, $\lambda$ is the wavelength of the light and p is the pixel pitch of the spatial light modulator device or of the image of the spatial light modulator device. In other words, a phase difference of $a*\pi$ between neighboring pixels of the spatial light modulator device is provided by the prism function, with which difference the virtual visibility region can be moved by $a*\frac{1}{2}$ diffraction orders, where a is a real-valued factor.

By adding a prism function, which may also be referred to as a linear phase function, selectively to individual subholograms or preferably to the overall hologram, or hologram, after adding up all the subholograms, the position of the at least one virtual visibility region in the observer plane can be moved, or displaced. Such displacement of the virtual visibility region, however, is carried out only in a small defined region. Expediently, the virtual visibility region may be displaced and arranged by means of the prism function between two diffraction order spots of two diffraction orders. In this way, the diffraction order spots may respectively be shifted or moved to the edge region of the virtual visibility region, so that even then there are less perturbations due to the diffraction order spot for an observer's eye pupil in the virtual visibility region, or for an observer.

Advantageously, in a further configuration of the invention, it may be provided that, for the case in which a colored scene to be reconstructed is provided, a defined prism function is provided for each wavelength or color used, the prism functions of different wavelengths or colors being different.

This is because it is necessary to take into account that, for different wavelengths or colors, diffraction orders also have a different spacing from one another. Adding up or adding the same prism function to a subhologram or a hologram also leads for different wavelengths or colors to a different displacement of the virtual visibility region. According to the invention, therefore, in a holographic display device a different prism function for each color or wavelength is added to or inserted into the subhologram or to the (overall) hologram so that the virtual visibility regions for all three primary colors red, green and blue (RGB) are shifted to the same position in the observer plane and are therefore superimposed exactly.

For example, for blue light of the wavelength $\lambda=450$ nm, a prism function of $0\pi$, i.e. a phase difference of $\pi$ between neighboring pixels of the spatial light modulator device, shifts the virtual visibility region by one half (½) of a diffraction order. The diffraction order spot would then lie at the edge region of the virtual visibility region. For green light of the wavelength $\lambda=532$ nm, however, the phase step from one pixel to the next pixel of the spatial light modulator device would need to be $450/532\pi$ so that the virtual visibility region for green light is shifted to the same position and is congruent or superimposed with the virtual visibility region for blue light. For red light of the wavelength $\lambda=635$ nm a phase step of $450/635\pi$ would need to be used so that the virtual visibility region for red light is shifted to the same position in the observer plane and is superimposed with the virtual visibility regions for blue light and green light. If this were not the case, an observer would perceive a white point inside the reconstructed preferably three-dimensional scene as red, green and blue points slightly offset laterally with respect to one another.

The prism function is the same for all subholograms or hologram of a wavelength or color.

A displacement of the virtual visibility region, however, generally leads to a modified brightness of the perceived preferably three-dimensional scene. Because of the fill factor and the amplitude transmission of each individual pixel in the spatial light modulator device, an intensity distribution of the light which decreases from the zeroth diffraction order to higher diffraction orders is formed in the far field. In general, for a virtual visibility region arranged centrally with respect to the spatial light modulator device, the reconstruction of the scene is brightest, i.e. the intensity of the light is highest in the central region. If the virtual visibility region is shifted by adding or inserting prism functions to or into the subholograms or holograms, the reconstruction of the scene may become darker. Only few diffraction orders, for example from two to three diffraction orders, can therefore advantageously be used. The virtual visibility region may therefore be laterally shifted only over a small path length or distance. The invention is not, however, intended to be restricted to a particular number of diffraction orders, over which the virtual visibility region can be shifted.

In this way, by means of defined prism functions written into the hologram or into the at least one subhologram of the spatial light modulator device, it is possible to provide tracking of the at least one virtual visibility region in the observer plane according to a new position of an eye of an observer of the scene. Correspondingly, it is proposed according to the invention to use displacement of the virtual visibility region only over a small region, for example over from two to three diffraction orders, for observer tracking.

In this way, such tracking of the at least one virtual visibility region may be used, or employed, as fine tracking.

Advantageously, the fine tracking of the at least one virtual visibility region can be combined with coarse tracking of the at least one virtual visibility region according to the position of an observer in the observer plane. The displacement of the virtual visibility region by means of adding prism functions to subholograms or to the (overall) hologram may therefore also be combined with other known methods of observer tracking. For example, the tracking of the virtual visibility region according to a new position of an observer with respect to the spatial light modulator device by means of prism functions may be used for fine tracking, and other optical elements, for example switchable gratings, may be used for coarse tracking.

Furthermore, an illumination device comprising at least one light source, and a position detection system for determining the position of an observer's eyes, may be provided. By means of the position detection system, the eye position of an observer of the preferably three-dimensional scene with respect to the spatial light modulator device can be determined. As a function of the detected eye position, subholograms are then calculated and added to form an overall hologram, or hologram. By means of adding or inserting a prism function preferably to or into the overall hologram or hologram, or also to the individual subholograms, the position of the virtual visibility region in the observer plane is then laterally displaced.

Furthermore, according to another advantageous configuration of the invention, it may be provided that a control device is provided, with which a modification of the brightness of a light source can be carried out.

A modification of the brightness of the reconstruction in the event of a displacement of the virtual visibility region in the observer plane may, for example, be compensated for by readjusting or adapting the brightness of the at least one light source. If it is accordingly determined by a position detection system that an observer's eye pupil is located in a region which corresponds to a central region of the virtual visibility region, as seen relative to a focal position of an optical system, for example of a field lens, the brightness of the at least one light source may be reduced by a control device. If, however, it is determined by the position detection system that the observer's eye pupil is located in a region which lies outside the central region of the virtual visibility region, as seen relative to a focal position of the optical system, the brightness of the at least one light source may be increased by the control device.

Another possibility for redistributing the light intensity in the diffraction orders may, for example, consist in reducing the fill factor of the pixels of the spatial light modulator device or influencing this light distribution in the diffraction orders by means of an apodization function for the amplitude or the phase of each pixel of the spatial light modulator device. In other words, it may be advantageous for the at least one spatial light modulator device, in particular the pixels, to be assigned an apodization profile with which a control of the light intensity in the diffraction orders is provided. Apodization is a method of optical filtering in which the outer rings of an Airy pattern, which represent the higher diffraction orders, are usually reduced or suppressed. In the context of this application, however, apodization is generally intended to be understood as meaning that the relative intensity of the light in the rings of an Airy pattern is modified. This also includes cases in which the light intensity in the outer rings of the Airy pattern is increased.

Conventionally, apodization is mostly used to improve the contrast of a scene to be reconstructed. The apodization of pixels may be carried out by means of an apodization function $t_{SLM-pixel}(x,y)$. Apodization functions are generally calculated according to their use and produced in a mask, a filter or a profile.

Apodization profiles are arranged as close as possible to the light-modulating optical layer of the spatial light modulator device. The apodization profile is either provided directly as an additional layer on the spatial light modulator device or integrated directly into the spatial light modulator device.

For example, a spatial light modulator device that modulates only the phase may be combined with an apodization profile that apodizes only the amplitude, or vice versa. In the general case, both the spatial light modulator device and the apodization profile may be used for complex-valued modulation.

By the combination of pixels of the spatial light modulator device and the apodization profile, an apodization function calculated with the corresponding rule in an apodization profile leads to a modulation of the incident light such that the intensity values in the Fourier plane of the spatial light modulator device, which is usually the observer plane, very closely approximate or correspond to the intensity profile specified there. Another parameter for the apodization function may be a phase function with constant amplitude. Further parameters (not specifically indicated here) in connection with the light modulation may also be optimized with a method for determining an apodization function for apodization profiles.

A cosine apodization of the amplitude of a pixel of the spatial light modulator device has, for example, the effect that although higher diffraction orders in the diffraction pattern are reduced, the light distribution in the 2 to 3 central diffraction orders nevertheless becomes more uniform. An amplitude profile as an apodization profile is therefore highly suitable for rendering or distributing the light, or the light intensity, more uniformly in selected diffraction orders.

If, for example, a cosine apodization of the amplitude of a pixel of the spatial light modulator device is used, because of the more uniform intensity distribution in the zeroth diffraction order and $\pm 1^{st}$ diffraction orders, in comparison with rectangular pixel transmission, this may advantageously be used in an arrangement in which, by means of a prism function which is written into the pixels of the spatial light modulator device, the virtual visibility region can be moved inside these three diffraction orders.

A microlens arrangement which comprises a multiplicity of lenses would also be a possibility for generating such a uniform distribution of the light in a plurality of diffraction orders. In this case, the microlens arrangement is assigned to the spatial light modulator device in such a way that one lens of the microlens arrangement is provided in front of each pixel of the spatial light modulator device, so that such an arrangement would act like phase apodization and lead to a more uniform distribution of the light or light intensities over a plurality of diffraction orders, in a similar way to a smaller fill factor of the spatial light modulator device.

Each microlens generates in a short distance a focus which is smaller than the aperture of the pixel and therefore acts in a similar way to a pixel having a reduced fill factor.

Similar methods and arrangements, as described in WO 2009/156191 A1, may similarly be used for apodization. For example, in a light modulator device with space-division multiplexing of the holograms for the left and right eye of an observer, or with space-division multiplexing of the colors, different apodization functions may also be used for the pixels which are assigned to the left and right eye, or for pixels of different colors. From WO 2009/156191 A1, however, there is the difference that reduction of the intensity in higher diffraction orders is sought therein, while according to the present invention, for the use of a displacement of the virtual visibility region in the observer plane by a few diffraction orders, it is however necessary for the intensity to be distributed as uniformly as possible over these few diffraction orders.

For example, a structured apodization profile layer and/or a retardation element, preferably an achromatic or apochromatic retardation layer, may be provided as an apodization profile. The apodization profile may be a microlens-like structure which is applied onto the pixel, or the apodization profile, also referred to as an apodization filter, may also be an absorbing alloy structure layer. For example, a microlens-like surface relief profile may be applied from the top downward onto a glass plate which has a thin layer on the top of it, this layer being for example an absorbing adhesive cured by UV.

An amplitude apodization profile of the SLM pixels used may therefore provide a reduced light intensity in the zeroth diffraction order and an increased light intensity in the higher diffraction orders of the SLM. This is attributable to a reduction of the spatial frequencies which are present in the SLM plane. The shape produced may, for example, be a type of Kaiser-Bessel window, a Gaussian window or only a cosine function.

For large pixels of, for example, about 100 μm for TV applications, it is possible to use a printed amplitude structure which is a continuous profile, and which rather intended not to present a periodic grating. The immersion of a microlens-like structure having a defined pixel pitch with the face downward into an absorbing colorant, which may be applied onto a mirror substrate, is preferred. The contact points in the microlens-like structure are clear and have an almost 100% reflectance. The regions between the lenses of this structure are dark. This works very well with a moderately large pixel pitch.

Another option for an apodization profile is the use of absorbing alloy compositions such as chromium oxides. An absorption is defined by the local thickness of such a composition. A moderately thick layer, for example of about 200 nm, may be locally thinned by the use of graytone lithography methods (also known as graytone, grayscale or halftone lithography). For example, a lithographic graytone negative lens arrangement, which is structured into photoresist (PR) as protective material, may be etched by dry or wet chemistry. It is also possible to produce this protective structure by using nanoimprint lithography (NIL) or a conventional molding process. The middle of the protective layer must be thinner than the outer region in order to produce a more transparent middle of the absorption material, which may for example be an alloy composition or another absorption material, for example platinum black (Pt) or a moderately solid absorption material.

Another option may be the use of a wire grid-like structure (wire grid polarizer). As an alternative, an absorbing structured filter may be arranged in front of a pixel. In both functionally opposite cases, the light has a defined distribution of the polarization state, which can be converted into an intensity profile by using a polarization filter acting as an analyzer.

In summary, it may be stated that a plurality of technologies may be used in order to provide the apodization profiles that can be used in a holographic display device.

In one advantageous configuration of the invention, the apodization profile may be configured as a phase apodization profile, each pixel of the at least one spatial light modulator device being assigned a phase function, the phase function being divided into two halves in such a way that the two halves respectively form a type of prism, the two prisms being mirror-symmetrical with respect to one another. The effect achievable by means of such an apodization profile is that there is less light, or a low light intensity, in the central zeroth diffraction order. In the neighboring $-1^{st}$ diffraction order and $+1^{st}$ diffraction order, however, the apodization profile can achieve the effect that there is more light, or a higher light intensity, there in comparison with a diffraction pattern without the use of an apodization profile.

Another possibility for adapting the light intensity in the diffraction orders is to use a aperture for the filtering, which is arranged in or close to an intermediate image plane of the virtual visibility region and has a grayscale profile. The grayscale profile of the aperture may be adjusted in such a way that the light intensity is partially filtered out from a brighter region of a diffraction order in order to reduce the difference from the darker regions of the diffraction order. This may be provided for a plurality of diffraction orders. In particular, the grayscale profile may be adjusted in such a way that such adaptation of the light intensity in the diffraction orders is carried out for diffraction orders that are essential to the invention, i.e. for the zeroth diffraction order and for the $\pm 1^{st}$ diffraction orders.

The various possibilities for adaptation of the light intensity in the diffraction orders may also be combined with one another.

Preferably, the holographic display device according to the invention may be designed as a head-up display, as a projection display or as a direct-view display.

Particularly preferably, the display device according to the invention may be designed as a head-mounted display.

In a head-mounted display (HMD), a spatial light modulator device and an optical system are arranged in a fixed defined position with respect to an observer's head, since a head-mounted display is generally fastened directly on the observer's head. The position of the spatial light modulator device with respect to the eye is therefore fixed and invariant. The position of the pupil of the eye can, however, vary over a limited range of a few millimeters inside the eye. Because of the relatively small distance from the head-mounted display to an observer's eye, the position detection system of the holographic display device according to the invention can detect or establish the position or location of the pupils in the eye with high accuracy.

Advantageously, in a head-mounted display a small virtual visibility region can also be generated in the observer plane. The virtual visibility region may be only slightly larger than the extent of an eye pupil, the virtual visibility region being trackable to the pupil of the eye. For example, a 7 mm large virtual visibility region could be generated in comparison with a typical pupil size of a human eye of about 2 mm-5 mm, depending on the light conditions. The range of tracking of the virtual visibility region to an eye movement only needs to comprise a few millimeters in this case, however, i.e. the range of a movement of the pupil from a right-hand edge region to a left-hand edge region of an observer's eye.

A displacement of the virtual visibility region in the observer plane may therefore advantageously be carried out by adding or inserting a prism function to or into the subhologram or the (overall) hologram. Such a displacement of the virtual visibility region would then be regarded, or configured, as fine tracking. Coarse tracking, of the virtual visibility region is therefore not required, since the observer's head, or the observer himself, does not move or change to a different position with respect to the virtual visibility region, or with respect to the display device. This obviates the need for use of other optical components for observer tracking, particularly for coarse tracking, for example diffraction devices based on liquid-crystal gratings (LCGs). The head-mounted display may therefore be configured more compactly in its structure, since such an omission of optical elements for the coarse tracking has a substantial influence on the size and the weight of the head-mounted display. Furthermore, the head-mounted display can be produced more economically since there are then only a small number of component parts in the display device, or in the display. In this case as well, a modification of the brightness of the reconstruction in the event of a displacement of the virtual visibility region may, for example, be carried out by means of the control device by adapting the brightness of the reconstruction accordingly.

The present object is furthermore achieved by a method as claimed in claim 26.

The method according to the invention for representing a two- and/or three-dimensional scene is carried out in such a way that at least one spatial light modulator device reconstructs a scene by modulation of light and generates at least one virtual visibility region in an observer plane, through which the reconstructed scene can be observed, an optical component having at least two regions having different transparency is formed, the value of the transparency respectively lying between 0 and 1, and at least partial filtering of a diffraction order spot in at least one diffraction order inside the at least one virtual visibility region is carried out with the optical component.

Advantageously, it may be provided that a hologram, which is composed of at least one subhologram, is encoded into the at least one spatial light modulator device, a prism function, with which the at least one virtual visibility region is displaced or tracked in the observer plane, being added to the hologram or to the subhologram.

The at least one spatial light modulator device may be assigned an apodization profile which applies an apodization function to each pixel of the spatial light modulator device.

It should generally be mentioned that displacement of the virtual visibility region by means of prism function(s) need not be connected with reduction or elimination of the diffraction order spot in the diffraction pattern, but may also be regarded as an independent invention. This means that according to the invention only the diffraction order spot is reduced or eliminated in a holographic display device. Alternatively, according to the invention only the virtual visibility region is displaced by means of prism function(s) in a holographic display device. Alternatively, according to the invention the diffraction order spot is reduced or eliminated, and in addition the virtual visibility region is displaced by means of prism function(s), in a holographic display device.

There are now various possibilities for advantageously configuring the teaching of the present invention, and/or for combining the above-described exemplary embodiments or configurations with one another. To this end, on the one hand, reference is to be made to the patent claims dependent on the independent patent claims, and on the other hand to the following explanation of the preferred exemplary embodiments of the invention with the aid of the drawings, in which preferred configurations of the teaching are also generally explained. The invention will be explained in principle with the aid of the exemplary embodiments described.

It should be mentioned briefly that elements/components/parts which are the same also have the same references in the figures.

DETAILED DESCRIPTION OF THE INVENTION

Figure 6:
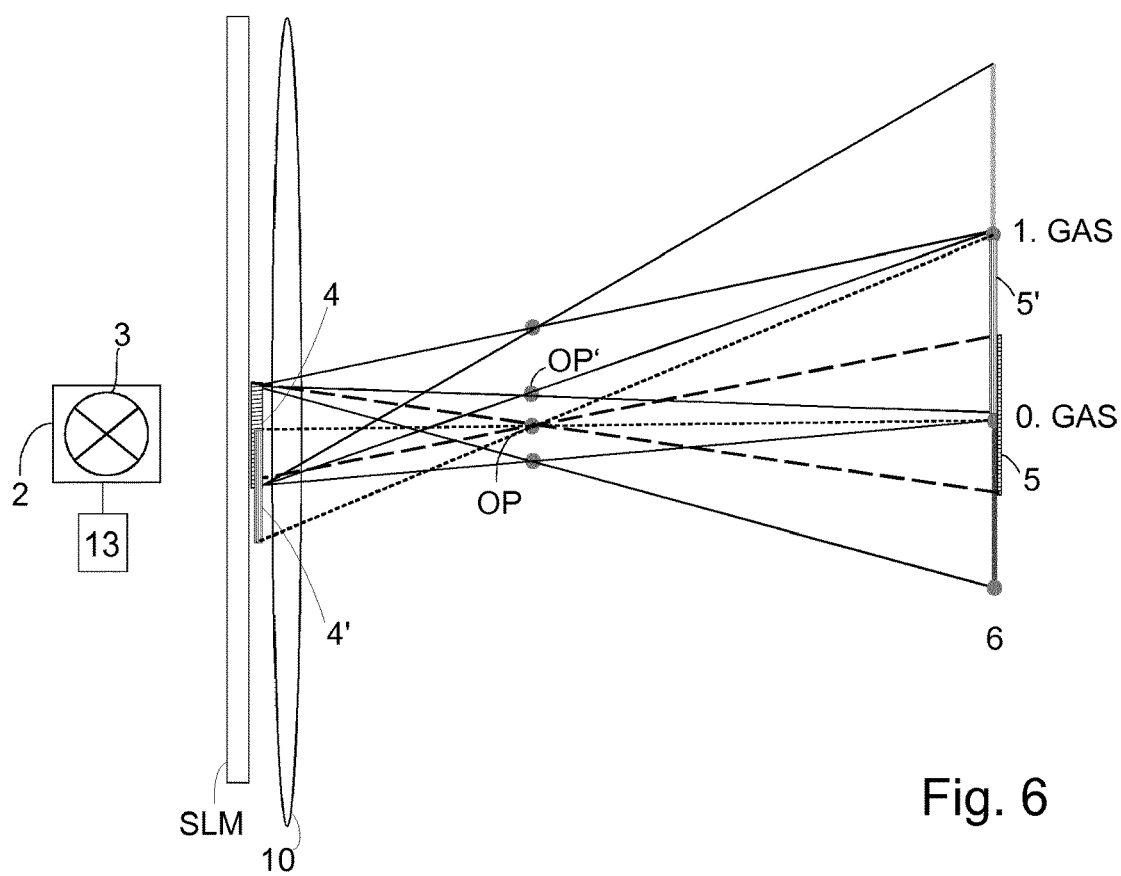
FIG. 6: shows a schematic representation of a holographic display device according to the invention.

FIG. 6 represents a holographic display device according to the invention, which comprises at least one spatial light modulator device SLM and an optical system 10. For the sake of clarity, the optical system 10 in this case comprises only one optical element, which is configured in the form of a lens, here a field lens, although the optical system 10 may of course also comprise a plurality of optical elements. A hologram, which contains information about a two-dimensional and/or three-dimensional scene to be reconstructed, is encoded into the spatial light modulator device SLM. The hologram may in this case be composed of a multiplicity of subholograms, but at least of one subhologram, a subhologram respectively containing the information relating to an object point of the scene. When light, which is emitted by an illumination device 2 comprising at least one light source 3, strikes the spatial light modulator device, which will be denoted below as SLM, the light is modulated in amplitude and phase with the information of the hologram so that a preferably three-dimensional scene can be reconstructed and represented in an observer region. For reasons of clarity, only one subhologram 4 is represented on the SLM in FIG. 6. When light strikes the SLM and is modulated, this subhologram 4 then reconstructs an object point OP.

Figure 5:
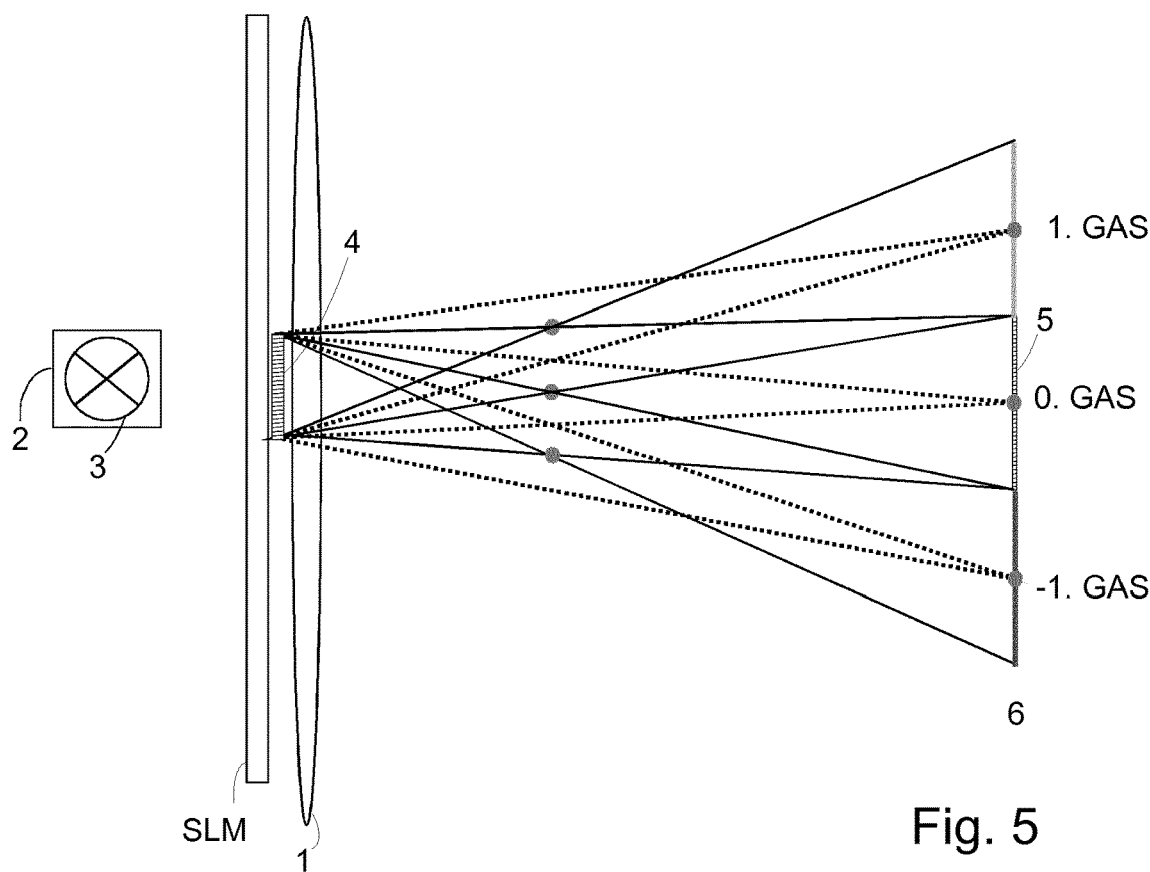

In the Fourier plane of the SLM, which in this case also forms the observer plane 6, the diffraction pattern, or the interference pattern resulting from interfering light, is formed, which besides the main maximum, the zeroth diffraction order, also exhibits side lobes, so-called higher diffraction orders. Because of modulation errors of the light, a diffraction order spot is formed in the zeroth diffraction order, which has a negative effect on the reconstructed scene. The diffraction order spot is repeated in the higher diffraction orders. In the observer plane 6, one virtual visibility region, or one virtual viewing window 5, is usually formed per eye of an observer, through which an observer can observe a reconstructed scene in an observer region. The extent of the virtual visibility region 5 corresponds approximately to the extent of a diffraction order. If, after it has been generated, this virtual visibility region 5 is arranged centrally with respect to the SLM, that is to say the virtual visibility region 5 lies inside the extent of the zeroth diffraction order, then the diffraction order spot lies in the central region of the virtual visibility region 5, this being represented in FIG. 5.

In order to reduce or eliminate the perturbing influences of the diffraction order spot GAS in the observer plane 6, provision is now made to move or displace the virtual visibility region 5. This displacement is carried out laterally along the observer plane 6. Furthermore, provision is made to carry out only a small displacement with an extent of from half a diffraction order to at most the extent of from 2 to 3 diffraction orders. The size of the displacement of the virtual visibility region 5 depends on the purpose of the displacement. In order, for example, to counteract or eliminate the influences of the diffraction order spot in the virtual visibility region 5, a displacement of the virtual visibility region 5 by an extent of half a diffraction order would be sufficient. If, however, such a displacement of the virtual visibility region 5 is used for the observer tracking, in this case in particular for the fine tracking, a displacement by an extent of from 1 to 3 diffraction orders may be expedient, depending on the new position of an observer's eyes.

A displacement of the virtual visibility region 5 is now carried out by adding or inserting a prism function to or into a subhologram 4 or the (overall) hologram. If the prism function is added to the subhologram, then all subholograms provided on the SLM, which form the hologram, need to be provided with a prism function. The prism function produces a phase difference of $a*\pi$ between neighboring pixels of the spatial light modulator device, so that the virtual visibility region in the observer plane can be moved or displaced by $a*½$ diffraction orders, a being a real factor. If, for example, a prism function with a phase difference of $\pi$ (pi) between neighboring pixels of the spatial light modulator device is used, the virtual visibility region in the observer plane is moved by half a diffraction order. A phase difference of $a*\pi$ between neighboring pixels with a real factor a therefore correspondingly leads to movement of the virtual visibility region by a times half a diffraction order. The size of the diffraction order corresponds to $D*\lambda/p$, where D is the distance from the virtual visibility region to the spatial light modulator device, or to the image of the spatial light modulator device when there is imaging of the spatial light modulator device, $\lambda$ is the wavelength of the light and p is the pixel pitch of the spatial light modulator device or of the image of the spatial light modulator device. The prism function is the same for all subholograms of a wavelength or color. It is, however, preferred to add the prism function to the hologram, or the overall hologram, since this reduces the computational effort. By means of the prism function, the virtual visibility region 5 can therefore be displaced. In this way, the relative position of the virtual visibility region 5 with respect to the diffraction order spot GAS thus changes, as represented in FIG. 6. For example, the virtual visibility region 5 can be displaced in such a way that the diffraction order spot GAS lies completely on the edge region of the virtual visibility region 5. This means that the virtual visibility region 5 is displaced and arranged by means of the prism function between two diffraction order spots, here in FIG. 6 between the diffraction order spot of the $+1^{st}$ diffraction order ($+1^{st}$ GAS) and the diffraction order spot of the zeroth diffraction order ($0^{th}$ GAS), so that these diffraction order spots respectively lie on the edge region of the virtual visibility region 5 and they have therefore been removed from the central region of the virtual visibility region 5. As a result of such a procedure, there are then substantially less perturbations or negative influences due to the diffraction order spot for an observer's eye pupil in the virtual visibility region 5.

If a prism function is added or inserted to or into a subhologram 4, which is assigned to a fixed position of the SLM, however, not only the position of the virtual visibility region 5 is displaced to the new position of the virtual visibility region 5' in the observer plane 6, but also the position of the object point OP reconstructed by the subhologram 4 is displaced to OP', as shown in FIG. 6. In most cases, however, such a displacement of the object point is not desired, since in this way there is always the same perspective of the reconstructed scene to be observed. This displacement of the object point OP to an object point OP' can be corrected by likewise displacing or moving the subhologram 4 on the SLM. The new position of the subhologram may, for example, be determined geometrically in such a way that a projection of the displaced virtual visibility region through the object point to be generated at the defined correct position to the SLM. This means that lines from the edge of the displaced virtual visibility region 5' are drawn to the position of the object point OP to the SLM, and the points of intersection with the SLM then characterize and form the new position of the subhologram, which is denoted by 4' for better distinction, as represented by the dotted lines in FIG. 6. A displaced position of the subholograms corresponds to a positionally fixed preferably three-dimensional scene. This means that, by the displacement of the virtual visibility region, the observer would observe the preferably three-dimensional scene from a slightly modified perspective. In other words, the observer would move a little, or a small distance, around the preferably three-dimensional scene by the displacement of the virtual visibility region.

This effect of the different perspective because of the displacement of the subhologram on the SLM may, however, also be undesired in particular cases.

For example, if there are a plurality of observers in front of a television who wish to see the same program, it may be expedient that a preferably three-dimensional scene can be perceived for each observer respectively from the same perspective regardless of the respective position of an observer in front of the television. In this case, a displacement of the subholograms on the SLM may be obviated. Only the addition or insertion of a prism function to or into the subhologram or the (overall) hologram is carried out. It is also preferred in this case for the prism function to be added to the (overall) hologram after all the subholograms have already been added to form this (overall) hologram. This procedure achieves the advantage that only a small computational effort is required in comparison with the case in which a prism function is added to each individual subhologram and these subholograms are then added to form the (overall) hologram. For illustration, FIGS. 6 to 8 respectively represent only a single subhologram. The present considerations regarding the invention are, however, also intended to apply accordingly for the overall hologram as a sum of many subholograms of the object points of the preferably three-dimensional scene.

With respect to a colored reconstructed preferably three-dimensional scene, it should be pointed out that a different prism function is added to or inserted into the subhologram or the (overall) hologram for each primary color RGB (red, green, blue) or each wavelength used, so that the individual virtual visibility regions for all colors or wavelengths are displaced or moved to the same position in the observer plane and are therefore superimposed exactly.

Figure 7:
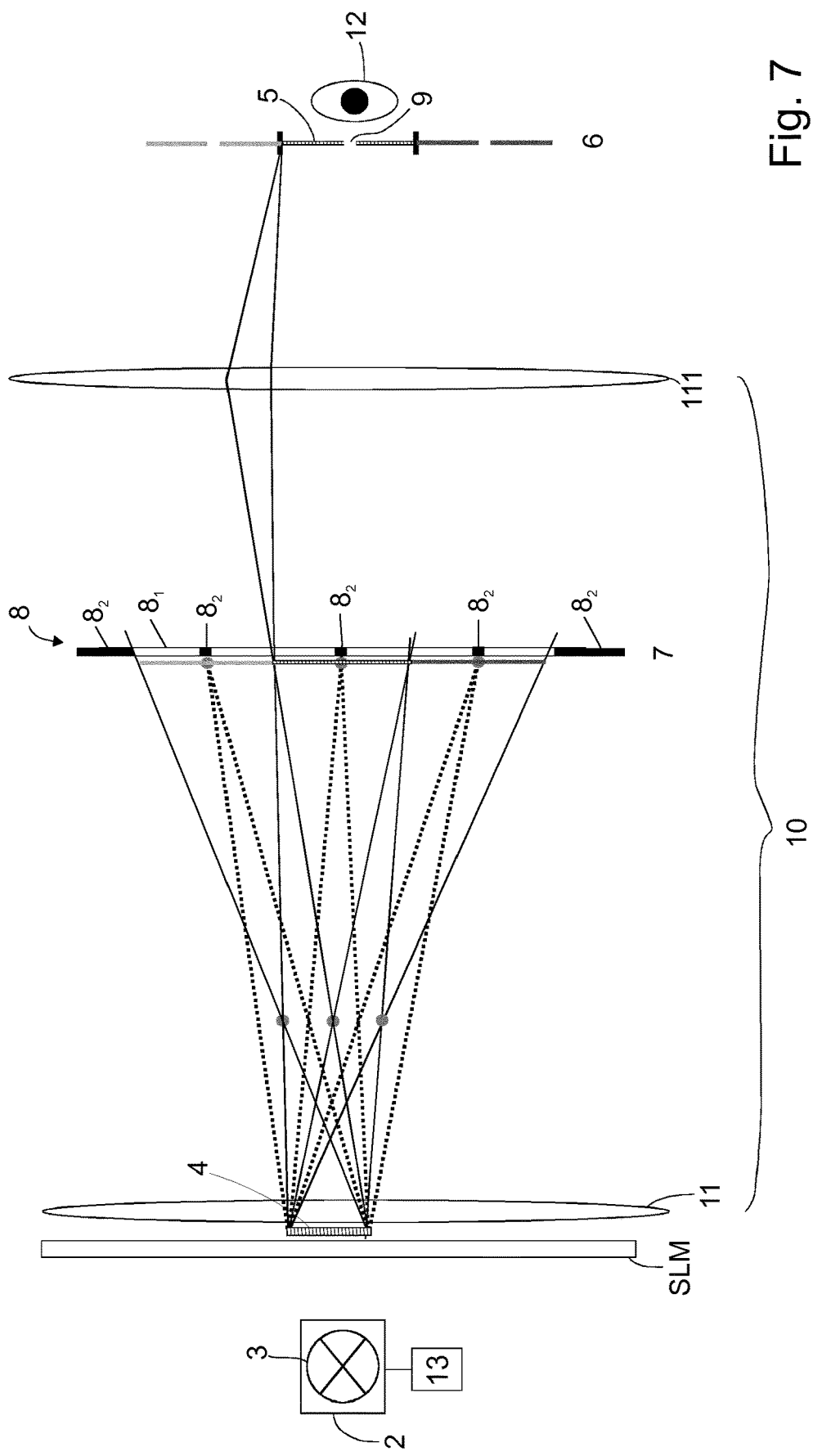
FIG. 7: shows a schematic representation of another configuration of a holographic display device according to the invention.

An alternative possibility to displacing the virtual visibility region by means of prism function(s) in order to reduce or eliminate the disadvantageous influences of the diffraction order spot in the zeroth diffraction order and its repetitions in the higher diffraction orders consists, according to FIG. 7, in reducing or filtering out the diffraction order spot by suitable measures. In this case, the display device may be configured as a two-stage system, which is in particular suitable for a projection display or also a head-mounted display. With such a setup of the display device, a real intermediate image of the SLM, as well as of the virtual visibility region, is first generated in an intermediate image plane 7 by means of the optical system 10, in this case particularly by means of the optical element 11 of the optical system 10. An optical component 8 is arranged in this intermediate image plane 7. The optical component 8 is configured in such a way that it comprises at least two regions $8_1$ and $8_2$. The at least two regions $8_1$ and $8_2$ of the optical component 8 have a different transparency to one another, the value of the transparency respectively lying between 0 and 1. In particular, the optical component 8 in FIG. 7 comprises a transparent or optically transmissive region $8_1$ and at least one opaque region $8_2$. The transparent region $8_1$ is used as a base region of the optical component 8, into which at least one opaque region $8_2$ is introduced. This means that the at least one opaque region $8_2$ is configured to be substantially smaller in its size than the transparent region $8_1$. The extent or size of the opaque region $8_2$ of the optical component 8 is configured to be smaller than an eye pupil of a human eye. Preferably, the size of the opaque region $8_2$ is only from 10% to 40% of the size of the eye pupil. The optical component 8 may be formed as a transparent film, which is configured in such a way that it is opaque, or blackened, at the position of the diffraction order spot and its periodic repetitions, but transmits light at other positions or in other regions, as shown in FIG. 7. According to FIG. 7, the diffraction order spot in the zeroth diffraction order and in the $\pm 1^{st}$ diffraction orders, as well as higher diffraction orders beyond the second diffraction order, are respectively filtered out.

Besides a film, the optical component 8 may also be configured as an actively switchable element. For example, the optical component 8 could be configured as a liquid-crystal layer. The liquid-crystal layer could in this case be combined with the at least one polarization element. Depending on the state of switching of the liquid-crystal layer by means of an electrode arrangement, the polarization element blocks or transmits the incident light. The shape of an electrode of the electrode arrangement for control the liquid-crystal layer may, for example, correspond to the region which is intended to be switched between transparent and opaque.

The optical component 8 may also be configured in such a way that it also transmits the light of a plurality of diffraction orders with the exception of the repetitions of the diffraction order spot in these diffraction orders. In addition, particular higher diffraction orders may also be filtered out completely, if this seems necessary.

After reduction or filtering out of the diffraction order spot and its repetitions in the individual diffraction orders, light is then missing in the virtual visibility region 5 at the position of the filtered-out diffraction order spot after imaging of the intermediate image plane 7 by means of the optical system 10. In other words, only a small region 9 at which no light arrives is formed in the virtual visibility region 5. For this imaging of the intermediate image plane 7 into the observer plane 6, in FIG. 7 an optical element 111 of the optical system 10 is provided, which is represented here as a lens. Since, however, the filtered diffraction order spot is generally much smaller in its size than the typical size of a human eye pupil, this lack of light in the virtual visibility region 5 does not have a perturbing effect on the preferably three-dimensional scene perceived by an observer in the observer region.

In order not to filter out the diffraction order spot completely in at least one diffraction order, but only to attenuate its intensity, it is also possible for the optical component to have a grayscale profile. This grayscale profile is configured in such a way that it has a darker gray value in the region of the diffraction order spot and therefore transmits less light, or attenuates the intensity in this region. In other regions of the diffraction order, in which there is no diffraction order spot or which are not directly influenced in their intensity thereby, a bright or brighter predefined gray value may be assigned so that enough light is still transmitted through the optical component and can reach an observer's eye.

In other words, in some cases it may be expedient for the optical component to additionally comprise regions having a transparency gradient, i.e. a grayscale profile. This grayscale profile, which may be provided only in a particular region or regions of the optical component or alternatively in the entire region of the optical component, may for example be used in order to modify the distribution of the light intensity in the virtual visibility region. For example, the distribution of the light intensity in the diffraction orders may have the effect that an observer whose eye pupil is located in an edge region of the virtual visibility region would perceive a darker reconstruction of a preferably three-dimensional scene than in the middle or in the opposite edge region of the virtual visibility region. In this case, by a grayscale profile of the transparency of the optical component, the light distribution can take place, or be generated, more uniformly by regions of the virtual visibility region with increased brightness being darkened.

Figure 8:
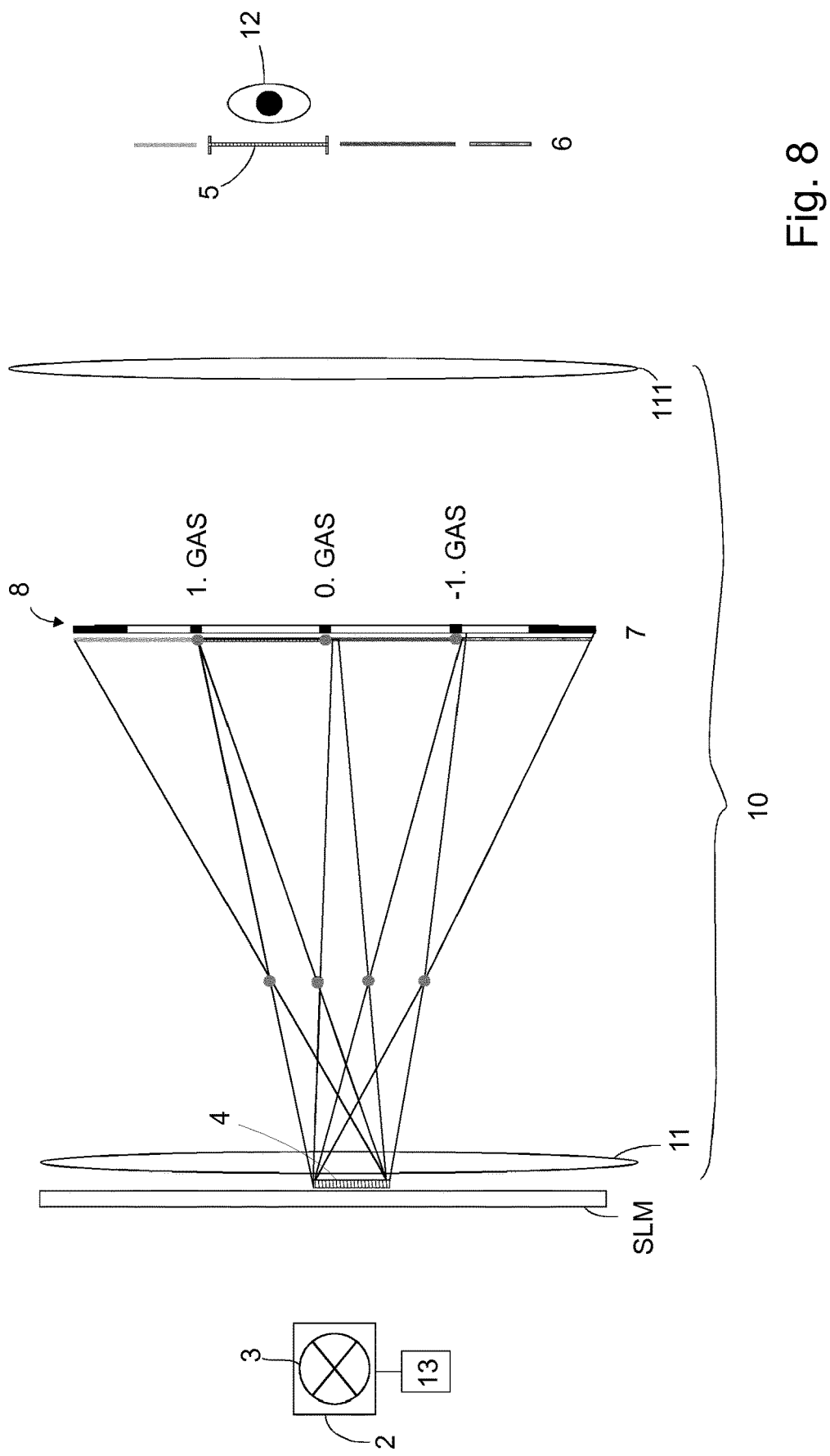
FIG. 8: shows a schematic representation of a third configuration of a holographic display device according to the invention.

FIG. 8 represents the holographic display device according to FIG. 7. In addition to the measures of reducing or filtering out the diffraction order spot from at least one diffraction order, provision may furthermore be made to displace the virtual visibility region 5 by the adding of prism functions to the subholograms or the (overall) hologram. In FIG. 8, the virtual visibility region 5 is displaced by the extent of half a diffraction order in order to track it to a displaced eye position of an observer. The example shows displacement of the virtual visibility region 5 by half a diffraction order. By selection of suitable prism functions, however, the virtual visibility region may also be displaced continuously in the observer plane 6. In the example according to FIG. 8, the displacement of the virtual visibility region 5 may take place within the extent of the three diffraction orders represented here, i.e. inside the zeroth diffraction order and $\pm 1^{st}$ diffraction orders, which are transmitted by the filtering by means of the optical component 8.

Instead of filtering of the diffraction order spot by means of an opaque region or region with reduced transmission, light from the diffraction order spot could for example also be deflected so that it does not reach the observer plane. The optical component in the intermediate image plane of the virtual visibility region could then be configured with a region which, although it is transparent, it does however have a phase function in the form of a prism. Light from this region is then preferably deflected in such a way that it travels laterally past the optical system, for example a lens or a lens system, for imaging the intermediate image of the virtual visibility region into the observer plane or into the virtual visibility region itself, and therefore advantageously does not reach the virtual visibility region in the observer plane. In comparison with filtering of the diffraction order spot by means of an opaque region, however, such an arrangement is more complex.

After the filtering of the diffraction order spot in the zeroth diffraction order and its repetitions in the higher diffraction orders, the virtual visibility region may selectively be arranged centrally, i.e. symmetrically with respect to the focal point of the optical system 10, or arranged displaced in one or another lateral direction by adding a prism function to the subhologram or to the (overall) hologram. In all positions of the virtual visibility region 5 in the observer plane 6, a reconstruction of the preferably three-dimensional scene with high quality can be observed by an observer, who is represented here by means of an eye 12.

The displacement of the virtual visibility region is preferably carried out over a small region, for example an extent of from 2 to 3 diffraction orders. Furthermore, the displacement of the virtual visibility region may be used or employed for observer tracking.

For observer tracking, the current position of an observer's eye is determined with a position detection system. As a function of the detected eye position, subholograms are then calculated and added to form a hologram, or an overall hologram. By means of addition or insertion of a prism function, preferably to or into the (overall) hologram or alternatively the individual subholograms, an encoding thereof in the SLM, after incidence of sufficiently coherent light on the SLM and its modulation by means of the SLM, the position of the virtual visibility region in the observer plane 6 is correspondingly displaced.

For calculation of the prism function, it is taken into account that a displacement by a real factor a times ½ a diffraction order corresponds to a phase difference of $a*\pi$ between neighboring pixels of the SLM. The sign of the phase difference between neighboring pixels determines whether the displacement of the virtual visibility region takes place laterally in one direction or laterally in the other direction.

The size of a diffraction order may therefore be determined as $BO=D*\lambda/p$, where D is the distance from the virtual visibility region to the SLM or to the image of the SLM, $\lambda$ is the wavelength of the light and p is the pixel pitch of the SLM or of the image of the SLM.

The phase difference between neighboring pixels can be calculated from the desired position of the virtual visibility region relative to the size of a diffraction order. If, for example, a diffraction order is BO=15 mm large and the virtual visibility region is intended to be displaced by 5 mm relative to the middle of the zeroth diffraction order, i.e. by ⅓ of a diffraction order, this gives a prism function having a phase difference of ⅔π between neighboring pixels of the SLM. A first pixel would for example receive a phase value of 0 (zero), a second pixel the phase value ⅔π, a third pixel the phase value ⁴⁄₃π, and a fourth pixel the phase value 0 (⁶⁄₃π modulo 2π). These phase values are added to the phase of the calculated hologram.

As shown by way of example in FIGS. 7 and 8, the optical component 8 for the filtering of the diffraction order spot in the zeroth diffraction order and in the $\pm 1^{st}$ diffraction orders and the filtering of all higher diffraction orders beyond the second diffraction order, is configured there as a film which comprises a plurality of blackened, light-blocking regions and a transparent optically transmissive region, which is subdivided into a plurality of regions, in which case the optically transmissive region may as already mentioned be regarded as a base region into which a plurality of opaque regions are introduced. In the exemplary embodiments shown in FIGS. 7 and 8, the optical component 8 is arranged at a fixed position with respect to the SLM in the holographic display device.

In the general case, however, a mobile, controllable optical component may be provided for filtering or reducing the diffraction order spot in at least one diffraction order. Since, for example, depending on an observer's eye position with respect to the SLM or the intermediate image of the SLM, only either the diffraction order spot in the zeroth diffraction order or in the $+1^{st}$ diffraction order or in the $-1^{st}$ diffraction order would lead to perturbations in the virtual visibility region, not all three diffraction order spots of these diffraction orders would need to be filtered out by the optical component, but respectively only one diffraction order spot among them. This means that it would only be necessary to filter out the diffraction order spot which lies in the virtual visibility region. The optical component therefore preferably only needs to be configured in such a way that only one individual opaque region is present besides the transparent region. The optical component having this single opaque region is then displaced, depending on the detected eye position of the observer, in such a way that the opaque region filters out one of the diffraction order spots—either the zeroth diffraction order spot or another higher-order diffraction order spot.

A displacement of the virtual visibility region would, however, usually lead to a modified brightness of the perceived preferably three-dimensional scene, which does not correspond to the real brightness. Because of the fill factor of the SLM and the amplitude transmission of the individual pixels in the SLM, an intensity distribution which decreases toward higher diffraction orders is formed in the far-field. This means that the reconstruction would be brightest if the virtual visibility region is arranged centrally, i.e. in the middle with respect to the SLM. If, however, the virtual visibility region is displaced by the addition of prism functions to a different position in the observer plane, the reconstruction becomes darker in its intensity. For this reason, it is only advantageously possible to use a few diffraction orders, for example from 2 to 3 diffraction orders, in which the virtual visibility region can be provided. The virtual visibility region may therefore be displaced only over small distances or extents laterally in the observer plane.

The displacement of the virtual visibility region by the provision of prism functions in the subhologram or the (overall) hologram may also be combined with already known methods of observer tracking. The proposed solution of tracking the virtual visibility region by means of prism functions may, for example, not only be used to eliminate a diffraction order spot in the virtual visibility region, but is also suitable in particular for fine tracking of the virtual visibility region. For coarse tracking of the virtual visibility region, optical elements may be used, for example switchable gratings.

One example would be a 7 mm large virtual visibility region or a viewing window in comparison with a typical pupil size of the human eye of from about 2 mm-5 mm, depending on the light conditions.

A modification of the brightness of the reconstruction by the adding of prism functions to the subhologram or the (overall) hologram in conjunction with a displacement of the virtual visibility region may, for example, be compensated for by controlling and readjusting the brightness of the illumination device 2, in particular of the at least one light source 3. If, accordingly, it is determined by the position detection system that the eye pupil of an observer of the preferably three-dimensional scene to be observed is located in a region which corresponds to a central position of the virtual visibility region, as seen relative to the focal position of the optical system, the brightness of the at least one light source 3 may be reduced with a control device 13 by light intensity adaptation. If, however, the position detection system determines that the eye pupil is located in a region which lies outside the central position of the virtual visibility region, as seen relative to the focal position of the optical system, then the brightness of the at least one light source 3 is increased by means of the control device 13 according to this position of the eye pupil in the virtual visibility region.

A redistribution of the light intensity in the diffraction orders may, as an alternative, also be achieved by reducing the fill factor of the pixels of the SLM. Furthermore, a redistribution of the light intensity in the diffraction orders could also be carried out by means of an apodization profile, which comprises an apodization function that influences the amplitude or the phase in each pixel of the SLM.

Although an apodization profile which produces a cosine apodization of the amplitude of a pixel leads, for example, to the higher diffraction orders being reduced, the light distribution in the 2 to 3 central diffraction orders in the diffraction pattern, i.e. the zeroth diffraction order and the $\pm 1^{st}$ diffraction orders, is however distributed more uniformly.

For example, a microlens arrangement which comprises a multiplicity of lenses, one lens being arranged in front of each pixel, would act like phase apodization and, similarly as a smaller fill factor of the SLM, would lead to distribution of the light over a plurality of diffraction orders in the diffraction pattern.

Figure 9:
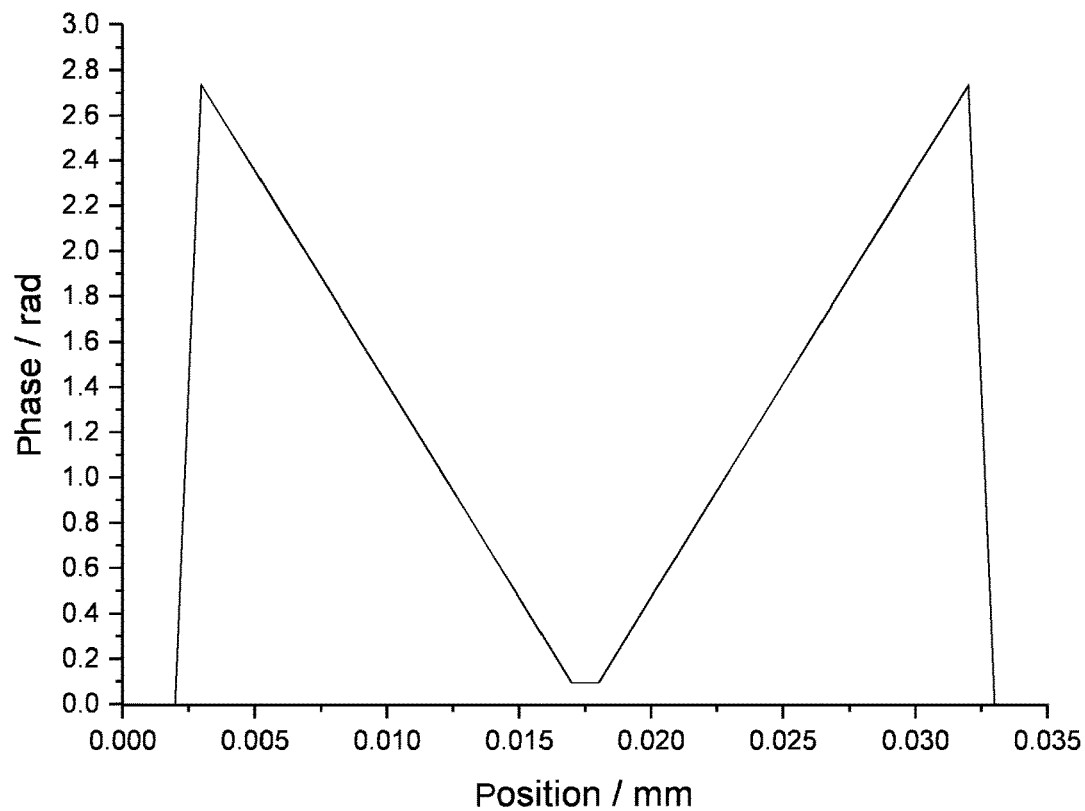
FIG. 9: shows a graphical representation of an apodization function inside a pixel of the spatial light modulator device.

For example, FIG. 9 represents an apodization profile which carries out phase apodization. For the apodization, a prism function subdivided into two halves is provided. This prism function is assigned to each pixel of the SLM. In this case, the prism function is configured in such a way that the left-hand and right-hand parts of the prism function of each pixel of the SLM form so-called mirror-symmetrically arranged prisms. As can be seen in FIG. 9, by means of such an apodization profile the intensity of the light in the central diffraction order, i.e. in the zeroth diffraction order, would therefore be reduced. In the higher diffraction orders, for example in the $\pm 1^{st}$ diffraction orders, however, the light intensity is increased by the redistribution of the light.

Figure 1:
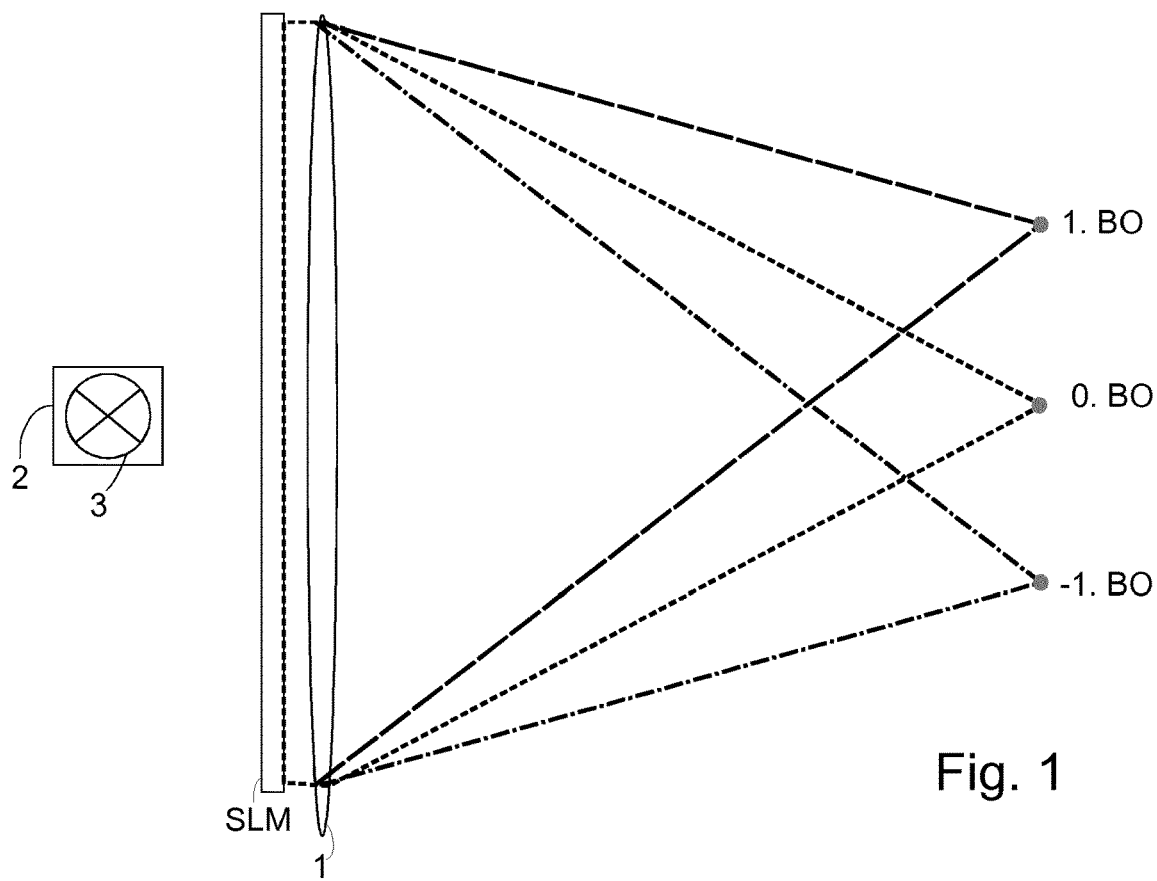
FIG. 1: shows a schematic representation of a holographic display device according to the prior art in conjunction with the representation of a diffraction pattern.
Figure 2:
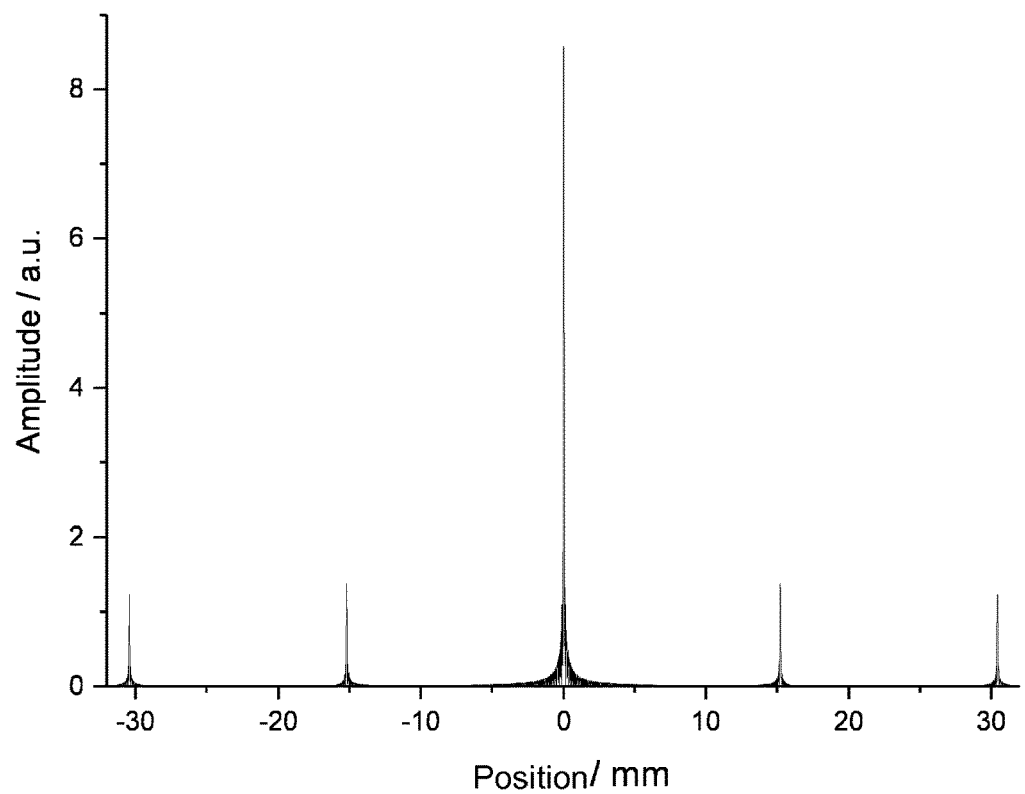
FIG. 2: shows a graphical representation of a light intensity distribution in a diffraction pattern according to the prior art, without an encoded hologram in the spatial light modulator device.
Figure 3:
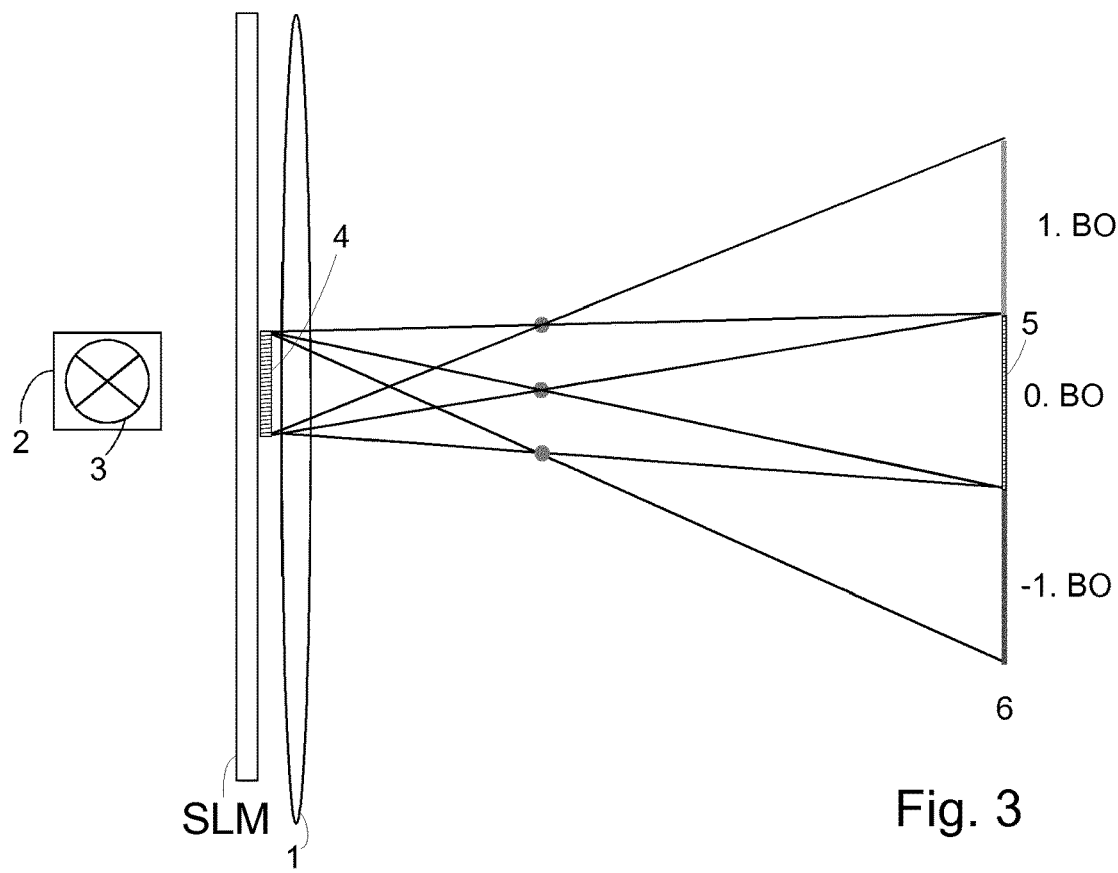
FIG. 3: shows a schematic representation of the display device according to FIG. 1 in the case of ideal modulation of the light by means of a spatial light modulator device comprising a hologram.
Figure 4:
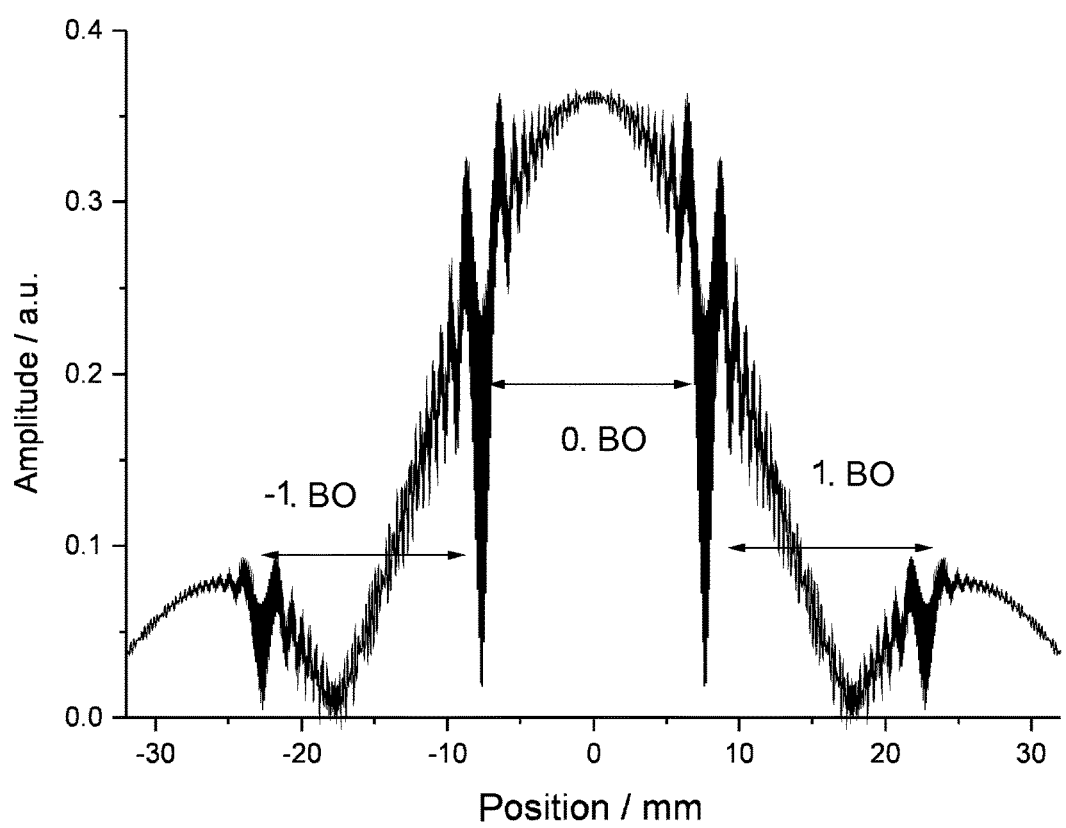
FIG. 4: shows a graphical representation of a light intensity distribution in a diffraction pattern which has been generated by means of the display device according to FIG. 3, FIG. 5: shows a schematic representation of the display device according to FIG. 1 in the case of real modulation of the light by means of a spatial light modulator device comprising a hologram.
Figure 10:
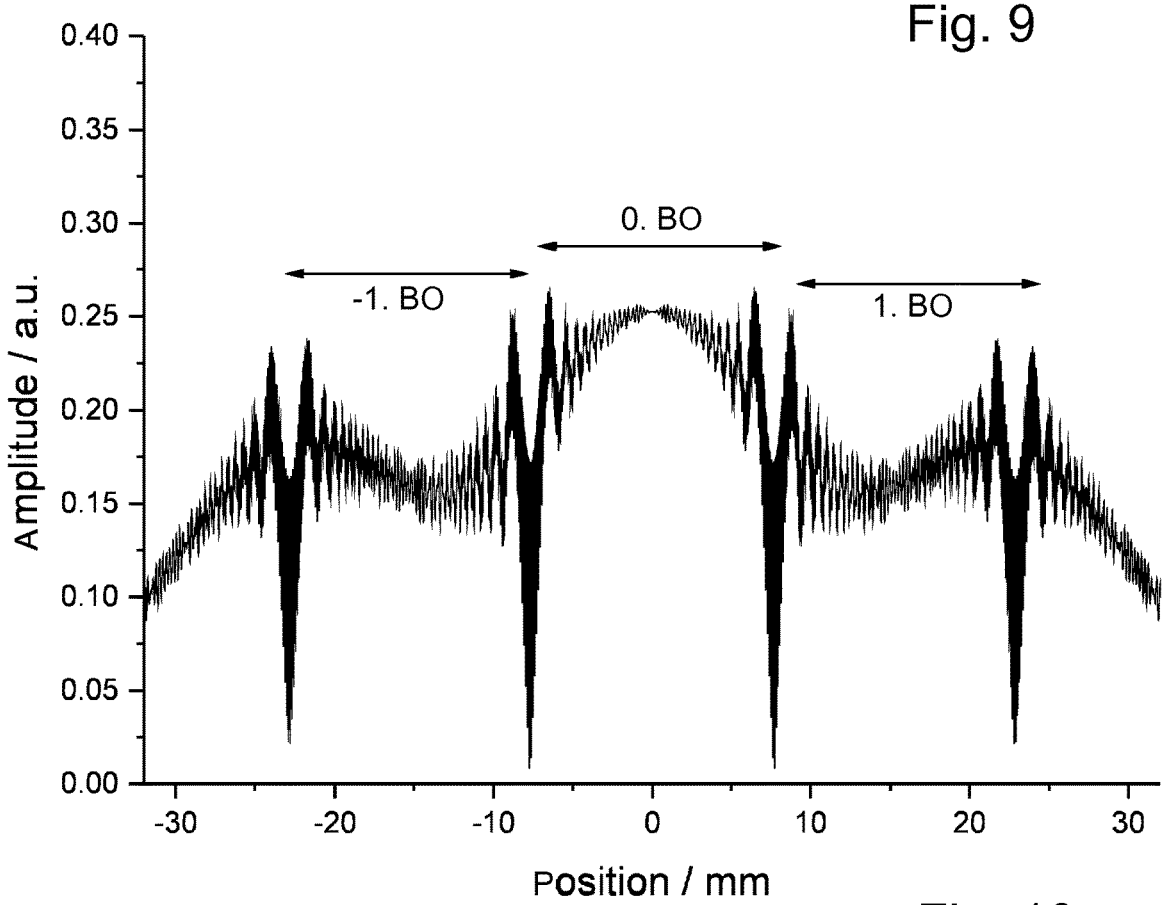
FIG. 10: shows a graphical representation of a light intensity distribution in a diffraction pattern according to the invention.

FIG. 10 shows in analogy to FIG. 4, in a graphical representation, an amplitude distribution in the three diffraction orders, zeroth diffraction order ($0^{th}$ BO), $+1^{st}$ diffraction order (+1$^{st}$ BO) and −1$^{st}$ diffraction order (+1$^{st}$ BO), as a result of the phase apodization shown in FIG. 9. The intensity distribution of the light in the respective diffraction orders is proportional to the square of the amplitudes shown. Comparison of FIGS. 4 and 10 shows that less light is directed into the zeroth diffraction order in FIG. 10, but instead more light is guided into the −1$^{st}$ diffraction order and the +1$^{st}$ diffraction order. As a result of this, the brightness modifications in the reconstruction of the preferably three-dimensional scene, which an observer would perceive when his eye moves between the −1$^{st}$ diffraction order, the zeroth diffraction order and the +1$^{st}$ diffraction order, are reduced in comparison with the display device according to FIG. 4, in which no such apodization profile is provided in the SLM.

Another alternative possibility for adaptation of the light intensity in the individual diffraction orders could be to use an aperture for filtering. To this end, such an aperture has a grayscale profile. The grayscale profile of the aperture is adjusted in such a way that the light intensity is partially filtered out from the brighter part of the diffraction order, for example from the zeroth diffraction order, in order to reduce the difference from the darker parts of the diffraction order, i.e. higher diffraction orders, for example the ±1$^{st}$ diffraction orders.

The various possibilities presented for adapting the light intensity in the individual diffraction orders may also be combined with one another.

For example, the apodization according to FIGS. 9 and 10 may be carried out, and in addition the brightness of the at least one light source 3 may be adapted by a control device 13 to the detected eye position.

The invention is not intended to be restricted to the exemplary embodiments represented here. Combinations of the exemplary embodiments are furthermore possible. In conclusion, it should more particularly be pointed out that the exemplary embodiments described above merely serve to describe the teaching claimed, but do not restrict it to the exemplary embodiments.

The invention claimed is:

1. A holographic display device for representing a two-dimensional and/or three-dimensional scene, comprising at least one spatial light modulator device and an optical component, where:
the at least one spatial light modulator device is provided to reconstruct the scene and to generate at least one virtual visibility region in an observer plane,
the optical component comprises a transparent region and at least one opaque region or at least one region having reduced transmission that have a different transparency to one another, the value of the transparency respectively lying between 0 and 1,
the at least one opaque region, or the at least one region having reduced transmission, of the optical component is configured to be substantially smaller in its size than the transparent region of the optical component,
the optical component is arranged in the display device in such a way that it provides filtering, to be carried out at least partially, of a diffraction order spot in at least one diffraction order inside the virtual visibility region.

2. The display device as claimed in claim 1, wherein the opaque region, or the at least one region having reduced transmission, of the optical component is configured in its size to be smaller than an eye pupil of the eye of the observer, and preferably corresponds to only from 10% to 40% of the size of an eye pupil.

3. The display device as claimed in claim 1, wherein the optical component is configured to be movably controllable.

4. The display device as claimed in claim 1, wherein the optical component comprises a plurality of transparent regions and a plurality of opaque regions, or a plurality of regions having reduced transmission, which are provided in such a way that diffraction order spots are filtered out in different diffraction orders.

5. The display device as claimed in claim 1, wherein the optical component is configured in such a way that determined higher diffraction orders are filtered out fully.

6. The display device as claimed in claim 1, wherein the optical component is provided in a plane of a generated intermediate image of the at least one virtual visibility region.

7. The display device as claimed in claim 1, wherein the optical component is configured as a film or as an actively switchable component, preferably as a component comprising a liquid-crystal layer.

8. The display device as claimed in claim 1, wherein the optical component is configured in such a way that it has a predetermined grayscale profile and/or a predetermined phase profile.

9. The display device as claimed in claim 8, wherein the grayscale profile is specified in the optical component in such a way that the light intensity respectively from a brighter region of a diffraction order is partially filtered out.

10. The display device as claimed in claim 1, wherein a hologram, which is composed of at least one subhologram, is encoded into the at least one spatial light modulator device.

11. The display device as claimed in claim 10, wherein the hologram or each subhologram comprises a prism function in order to displace the virtual visibility region in the observer plane.

12. The display device as claimed in claim 11, wherein with the prism function a phase difference of $a*\pi$, with which the virtual visibility region is displaceable by $a*\frac{1}{2}$ diffraction orders, is provided between neighboring pixels of the spatial light modulator device, where a is a real-valued factor.

13. The display device as claimed in claim 11, wherein the virtual visibility region is displaceable or arrangeable by means of the prism function between two diffraction order spots of two diffraction orders.

14. The display device as claimed in claim 11, wherein for the case in which a colored scene to be reconstructed is provided, a defined prism function is provided for each wavelength or color used, the prism functions of different wavelengths or colors being different.

15. The display device as claimed in claim 1, wherein tracking of the at least one virtual visibility region according to a new position of an eye of an observer of the scene is provided by means of defined prism functions written into the hologram or into the at least one subhologram.

16. The display device as claimed in claim 15, wherein the tracking of the at least one virtual visibility region is provided as fine tracking over a range of from two to three diffraction orders.

17. The display device as claimed in claim 16, wherein the fine tracking of the at least one virtual visibility region is combinable with coarse tracking of the at least one virtual visibility region according to the position of an observer in the observer plane.

18. The display device as claimed in claim 14, wherein the prism function is the same for all subholograms of one wavelength or color.

19. The display device as claimed in claim 1, wherein an illumination device comprising at least one light source, and a position detection system for determining the position of an observer's eyes, are provided.

20. The display device as claimed in claim 19, wherein a control device is provided, with which a modification of the brightness of a light source can be carried out.

21. The display device as claimed in claim 1, wherein the at least one spatial light modulator device is assigned an apodization profile, with which a control of the light intensity in the diffraction orders is provided.

22. The display device as claimed in claim 21, wherein the apodization profile is configured as a phase apodization profile, each pixel of the at least one spatial light modulator device being assigned a phase function, the phase function being divided into two halves in such a way that the two halves respectively form a type of prism, the two prisms being mirror-symmetrical with respect to one another.

23. The display device as claimed in claim 1, wherein the display device is designed as a head-mounted display, as a head-up display, as a projection display or as a direct-view display.

24. A method for representing a two-dimensional and/or three-dimensional scene, where at least one spatial light modulator device reconstructs a scene by modulation of light and generates at least one virtual visibility region in an observer plane, through which the reconstructed scene can be observed, comprising:

forming an optical component comprising a transparent region and at least one opaque region or at least one region having reduced transmission, said at least two regions having different transparency, the value of the transparency respectively lying between 0 and 1, and configuring the at least one opaque region, or the at least one region having reduced transmission, of the optical component to be substantially smaller in its size than the transparent region of the optical component, and carrying out an at least partial filtering of a diffraction order spot in at least one diffraction order inside the at least one virtual visibility region is carried out with the optical component.

25. The method as claimed in claim 24, wherein a hologram, which is composed of at least one subhologram, is encoded into the at least one spatial light modulator device, a prism function, with which the at least one virtual visibility region is displaced or tracked in the observer plane, being added to the hologram or to the subhologram.

26. The method as claimed in claim 24, wherein the at least one spatial light modulator device is assigned an apodization profile which applies an apodization function to each pixel of the spatial light modulator device.

* * * * *